United States Patent
Tallman (10) Patent No.: US 10,279,388 B2
(45) Date of Patent: May 7, 2019

(54) METHODS FOR FORMING COMPONENTS USING A JACKETED MOLD PATTERN

(71) Applicant: General Electric Company, Schenectady, NY (US)

(72) Inventor: James Albert Tallman, Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 246 days.

(21) Appl. No.: 15/227,380

(22) Filed: Aug. 3, 2016

(65) Prior Publication Data

US 2018/0036792 A1 Feb. 8, 2018

(51) Int. Cl.
| | | |
|---|---|---|
| *B22C 9/10* | (2006.01) | |
| *B22D 19/00* | (2006.01) | |
| *B33Y 10/00* | (2015.01) | |
| *B33Y 80/00* | (2015.01) | |

(52) U.S. Cl.
CPC ............... *B22C 9/10* (2013.01); *B22D 19/00* (2013.01); *B33Y 10/00* (2014.12); *B33Y 80/00* (2014.12)

(58) Field of Classification Search
CPC ........... B22C 9/10; B22C 9/103; B22C 9/108; B22D 19/00
USPC ........................................ 164/23, 28, 30, 91
See application file for complete search history.

(56) References Cited

U.S. PATENT DOCUMENTS

| | | | |
|---|---|---|---|
| 3,206,810 A * | 9/1965 | Hockin et al. ........... | B22C 1/165 106/38.3 |
| 5,295,530 A * | 3/1994 | O'Connor et al. ....... | B22C 9/04 164/133 |
| 5,318,094 A | 6/1994 | Joy et al. | |
| 5,545,367 A | 8/1996 | Bae et al. | |
| 5,641,448 A | 6/1997 | Yeung et al. | |
| 2005/0189086 A1* | 9/2005 | Caputo et al. .......... | B22C 21/14 164/361 |
| 2006/0130996 A1* | 6/2006 | Bewlay et al. ......... | B22C 1/186 164/519 |
| 2006/0188650 A1 | 8/2006 | Sauer | |

(Continued)

FOREIGN PATENT DOCUMENTS

| | | |
|---|---|---|
| WO | 2015006440 A1 | 1/2015 |
| WO | 2015006479 A1 | 1/2015 |
| WO | 2015051916 A1 | 4/2015 |

OTHER PUBLICATIONS

Liu et al., "Effect of nickel coating on bending properties of stereolithography photo-polymer SL5195", Materials & Design, vol. 26, Issue: 6, pp. 493-496, 2005.

(Continued)

*Primary Examiner* — Kevin P Kerns
(74) *Attorney, Agent, or Firm* — GE Global Patent Operation; John Darling (57) ABSTRACT

A method of forming a component includes coupling a jacket around at least a portion of a precursor component to form a jacketed precursor component. The jacket is shaped to correspond to a net shape of an outer surface of the component. A mold is formed around the jacketed precursor component. A component material in a fluid state is introduced into a jacketed cavity defined in the mold to form the component. The jacketed cavity is defined in a space at least partially created by removal of the precursor component from the jacketed precursor component.

21 Claims, 6 Drawing Sheets

(56) References Cited

U.S. PATENT DOCUMENTS

2009/0178775 A1* 7/2009 Bewlay et al. ........... B22C 3/00
164/72
2010/0219325 A1* 9/2010 Bullied et al. ............ B22C 3/00
249/175
2015/0306657 A1 10/2015 Frank
2016/0175923 A1* 6/2016 Liu et al. .................. B22C 9/04
164/271

OTHER PUBLICATIONS

Cheah et al., "Rapid prototyping and tooling techniques: a review of applications for rapid investment casting", The International Journal of Advanced Manufacturing Technology, vol. 25, Issue: 3, pp. 308-320, Feb. 2005.

* cited by examiner

METHODS FOR FORMING COMPONENTS USING A JACKETED MOLD PATTERN

BACKGROUND

The field of the disclosure relates generally to forming components via casting, and more particularly to forming a jacketed mold pattern for casting such components.

At least some metallic components are formed at least partially by casting. Some casting methods facilitate the production of near net shaped components where the component is substantially formed in one step during the casting process and finish machined to complete the component. At least some components include intricate shapes and contours and/or require an outer surface to be formed with particular features. For example, but not by way of limitation, some components, such as hot gas path components of gas turbines, are subjected to high temperatures. At least some such components have intricate shapes and contours, such as but not limited to, surface features for promoting cooling and structures to promote mixing of fluid streams.

At least some such known components are formed in a mold having a cavity that defines the external shape of the component. A molten metal alloy is introduced to the cavity of the mold, and in some methods, around a ceramic core, and cooled to form the component. However, an ability to produce an intricate near net component depends on an ability to precisely define the pattern used to create the mold. At least some known patterns are fragile, resulting in patterns and/or cores that are difficult and expensive to produce and handle without damage during the mold creation and casting process.

Alternatively or additionally, at least some known components are formed by drilling and/or otherwise machining the component to obtain the final shape, such as, but not limited to, using an electrochemical machining process. However, at least some such machining processes are relatively time-consuming and expensive. Moreover, at least some such machining processes cannot produce an outer wall having the features, shape, and/or contours required for certain component designs.

BRIEF DESCRIPTION

In one aspect, a method of forming a component is provided. The method includes coupling a jacket around at least a portion of a precursor component to form a jacketed precursor component. The jacket is shaped to correspond to a net shape of an outer surface of the component. The method also includes forming a mold around the jacket. In addition, the method includes introducing a component material in a fluid state into a jacketed cavity defined in the mold. The jacketed cavity is defined in a space at least partially created by removal of the precursor component from the jacketed precursor component.

In another aspect, another method of forming a component is provided. The method includes forming a jacket from a jacket material. The jacket is shaped to correspond to a net shape of an outer surface of the component. The method also includes coupling a refractory mold material to an outer surface of the jacket to form a shell, and firing the shell to form a mold assembly. The jacket defining a jacketed cavity within the mold assembly. Moreover, the method includes introducing the component material in a fluid state into the jacketed cavity defined in the mold assembly. In addition, the method includes cooling the component material to form the component. A shape of the outer surface of the jacket at least partially defines the net shape of the outer surface of the component.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components and methods described herein overcome at least some of the disadvantages associated with known assemblies and methods for forming cast components. The embodiments described herein include forming a pattern or precursor component shaped to correspond to a shape of at least portions of the component, and forming a jacket around the precursor component. The jacketed precursor component is used to fabricate a mold. The precursor component material is removed to form a jacketed mold cavity within the mold. Alternatively, the jacket is formed without the precursor component. The component is cast in the jacketed mold cavity defined between the jacket walls of the mold. When a molten or fluid component material is added to the mold, the jacket and the mold interior wall cooperate to define the outer surface of the component therein.

Figure 1:
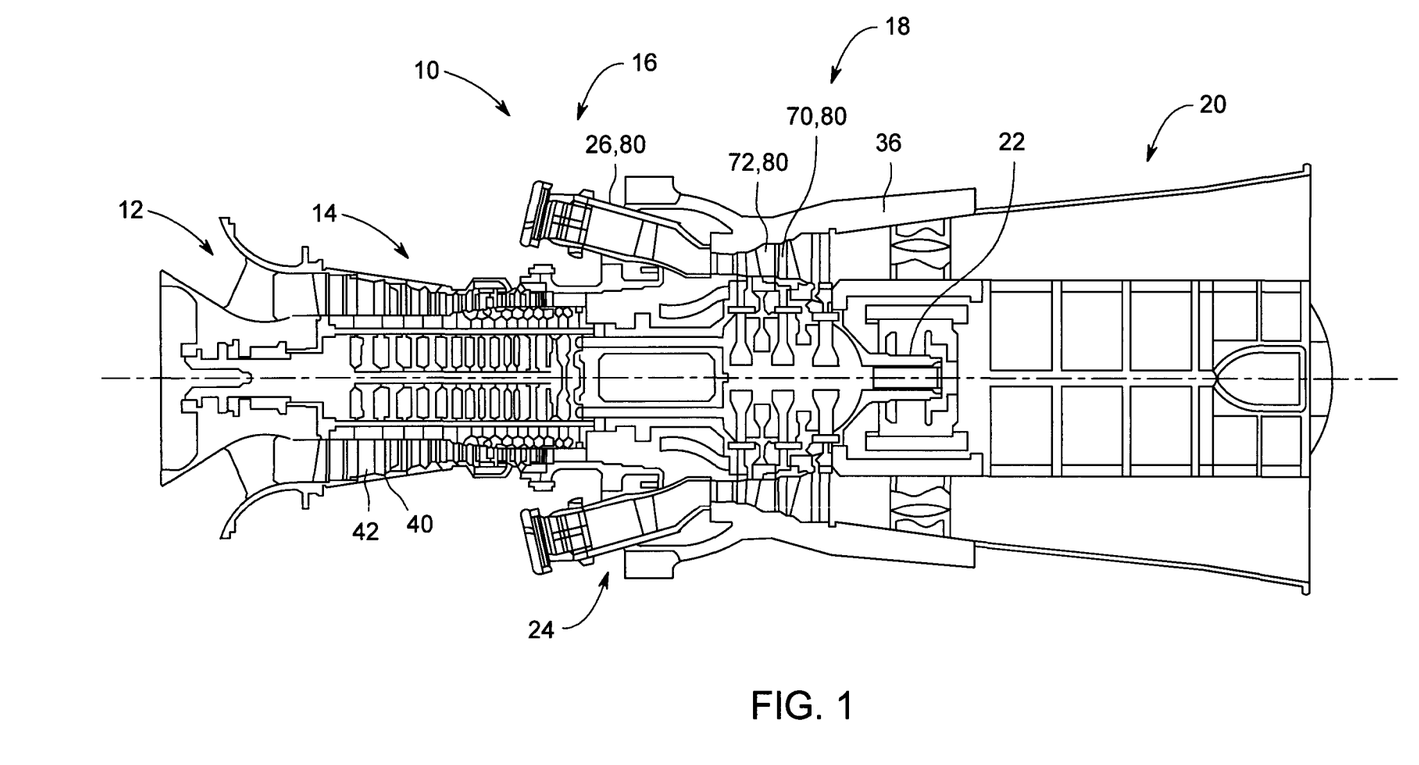
FIG. 1 is a schematic diagram of an exemplary rotary machine including a plurality of components.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed as described herein are suitable. Moreover, although embodiments of the present disclosure are described in the context of a rotary machine for purposes of illustration, it should be understood that the embodiments described herein are applicable in any context that involves a component suitably formed.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24 including a combustion liner 26, in which a fuel, for example, natural gas and/or fuel oil, is injected into the air flow, and the fuel-air mixture is ignited to generate high temperature combustion gases that are channeled towards turbine section 18. In one embodiment, for example, combustor 24 includes a fuel injection system (not shown) including multiple fuel nozzles (not shown). Each fuel nozzle includes a swirler (not shown) to facilitate mixing the fuel with the air flow to generate the fuel-air mixture.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10 are designated as components 80. Components 80 proximate a path of the combustion gases are subjected to high temperatures during operation of rotary machine 10. Additionally or alternatively, components 80 include any component suitably formed as described herein.

Figure 2:
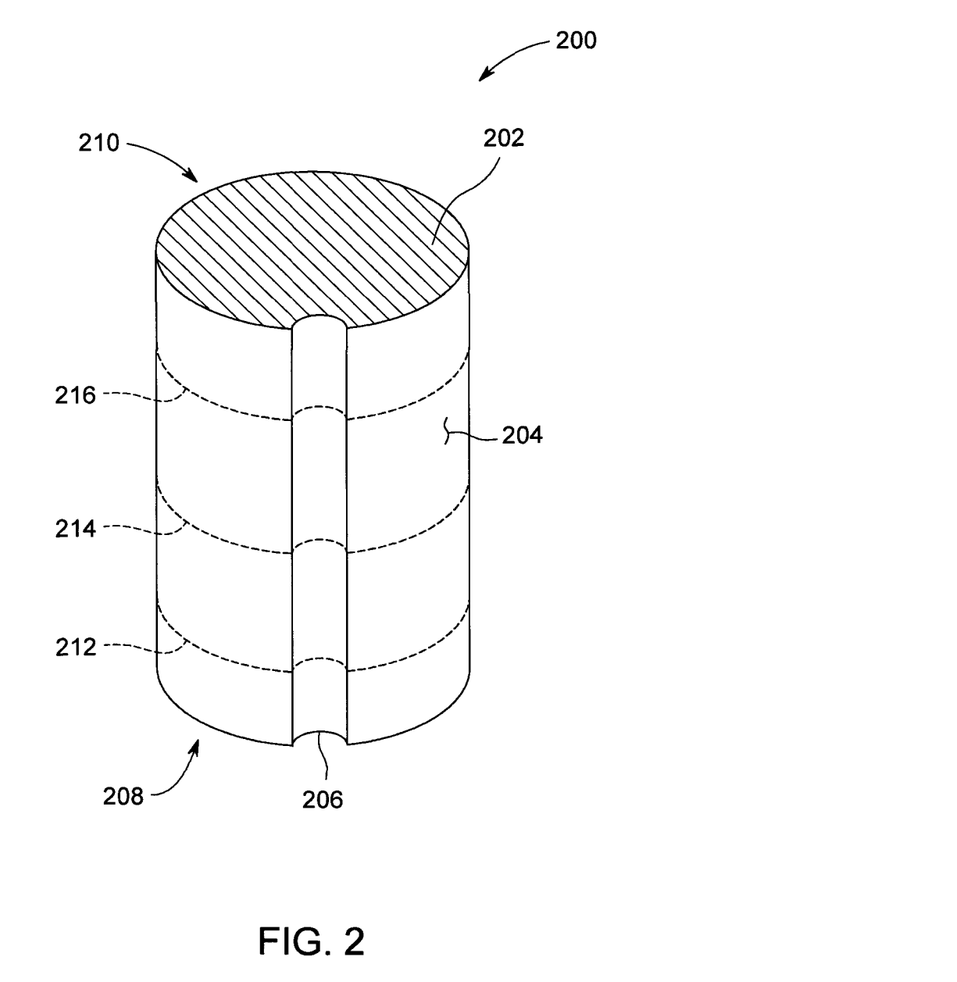
FIG. 2 is a schematic perspective view of an exemplary pattern or precursor component that may be used to form a component shown in FIG. 1.

FIG. 2 is a schematic perspective view of an exemplary pattern or precursor component 200 that may be used to form a component, such a component 80 of rotary machine 10 (shown in FIG. 1). Component 80 can include, for example and without limitation, combustion liner 26, a swirler (not shown) of combustor 24, rotor blade 70, stator vane 72, and any component suitably formable as described herein and for use in any application. In the exemplary embodiment, pattern or precursor component 200 is formed from a precursor material 202 and has a shape corresponding to a shape of at least portions of component 80. More specifically, in certain embodiments, precursor component 200 has a shape corresponding to the net shape of component 80. A size of precursor component 200 is reduced relative to a net size of component 80 to account for additional processing of precursor component 200 as described herein or, for example and without limitation, to account for material shrinkage when forming component 80. Precursor component 200 includes an outer surface 204 that includes at least one outer surface feature 206 defined therein. In some alternative embodiments, outer surface 204 includes any type and number of surface features, including for example, openings extending therethrough (not shown), that enable precursor component 200 to function as described herein. In other alternative embodiments, precursor component 200 does not include outer surface feature 206.

In some embodiments, precursor component 200 is formed at least partially using a suitable additive manufacturing process, and precursor material 202 is selected to facilitate additive manufacture of precursor component 200. For example, in the exemplary embodiment, a computer design model (not shown) of precursor component 200 is developed from a computer design model (not shown) of component 80. The computer design model for precursor component 200 is sliced into a series of thin, parallel slices (not shown) between a first end 208 and a second end 210 of precursor component 200. A computer numerically controlled (CNC) machine (not shown) deposits successive layers of precursor material 202 from first end 208 to second end 210 in accordance with the model slices to form precursor component 200. Three such representative layers are indicated as layers 212, 214, and 216.

In some such embodiments, precursor material 202 is selected to be a photopolymer, and the successive layers, e.g., layers 212, 214, and 216, of precursor material 202 are deposited using a stereolithographic process. Alternatively, precursor material 202 is selected to be a thermoplastic, and the successive layers of precursor material 202 are deposited using, for example and without limitation, at least one of a fused filament fabrication process, an inkjet/powder bed process, a selective heat sintering process, and a selective laser sintering process. Additionally or alternatively, precursor material 202 is selected to be any suitable material, and the successive layers of precursor material 202 are deposited using any suitable process that enables precursor component 200 to be formed as described herein. It should be understood that in some alternative embodiments, precursor component 200 is formed from a plurality of separately additively manufactured sections (not shown) that are subsequently coupled together in any suitable fashion.

In certain embodiments, the formation of precursor component 200 by an additive manufacturing process enables precursor component 200 to be formed with a nonlinearity, structural intricacy, precision, and/or repeatability that is not achievable by other methods. Accordingly, the formation of precursor component 200 by an additive manufacturing process enables the formation of component 80 with a correspondingly increased nonlinearity, structural intricacy, precision, and/or repeatability. Moreover, in some embodiments, the formation of precursor component 200 by an additive manufacturing process using precursor material 202 that is a photopolymer or thermoplastic decreases a cost and/or a time required for manufacture of component 80, as compared to forming component 80 directly by additive manufacture using a metallic component material.

In alternative embodiments, precursor component 200 is formed in any suitable fashion that enables precursor component 200 to function as described herein. For example and without limitation, a suitable pattern material, such as wax, is injected into a suitable pattern die (not shown) to form precursor component 200. It should be understood that in certain embodiments, precursor component 200 is formed from a plurality of separately formed sections that are subsequently coupled together in any suitable fashion.

Figure 3:
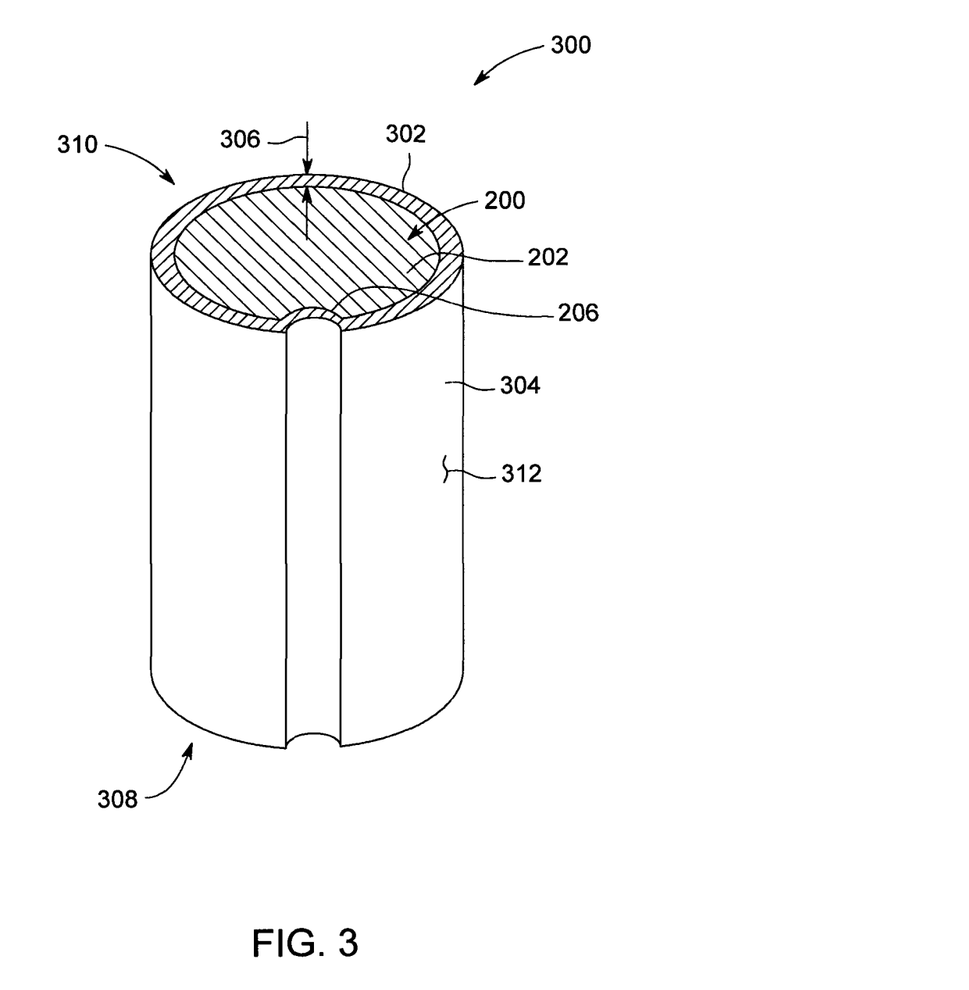
FIG. 3 is a schematic perspective view of an exemplary jacketed precursor component that includes an exemplary jacket coupled to the exemplary precursor component shown in FIG. 2.

FIG. 3 is a schematic perspective view of an exemplary jacketed precursor component 300 that includes an exemplary jacket 302 coupled around at least a portion of precursor component 200. In the exemplary embodiment, jacket 302 includes at least one layer of a jacket material 304 adjacent at least a portion of outer surface 204 (shown in FIG. 2) and outer surface feature 206 of precursor component 200. Thus, jacket 302 has a shape substantially corresponding to outer surface 204 and outer surface feature 206 of precursor component 200.

In certain embodiments, as described herein, a size of a perimeter of precursor component 200 is reduced relative to the net size of component 80 by a thickness 306 of jacket 302, such that a combined size of jacket 302 and precursor component 200 corresponds to the net size of component 80. Alternatively, a size of precursor component 200 is not reduced relative to the net size of component 80, and thickness 306 of jacket 302 is relatively small compared to the net size of component 80, such that the combined size of jacket 302 and precursor component 200 approximately corresponds to the net size of component 80. An outer surface 312 of jacket 302 has a shape corresponding to the exterior shape (not shown) of component 80.

In the exemplary embodiment, jacket 302 has a substantially uniform thickness 306. In alternative embodiments, thickness 306 varies over at least some portions of jacket 302. In certain embodiments, thickness 306 is selected to be small relative to the size of precursor component 200. In some embodiments, thickness 306 also is selected such that jacket 302 provides at least a minimum selected structural stiffness such that the size and shape of jacketed precursor component 300 is maintained when precursor material 202 is not positioned therebetween, as will be described herein. In the exemplary embodiment, thickness 306 of jacket 302 is in the range between about 0.005 inches (in.) (0.13 millimeters (mm)) and about 0.015 in. (0.38 mm). Alternatively, thickness 306 of jacket 302 can be any thickness that enables jacket 302 to function as described herein.

In the exemplary embodiment, jacket material 304 is selected to be at least partially absorbable by a molten or fluid material used to form component 80. For example, in one embodiment, the component 80 material is an alloy, and jacket material 304 is at least one constituent material of the alloy. Moreover, in some embodiments, jacket material 304 includes a plurality of materials disposed on precursor component 200 in successive layers, as will be described herein.

Figure 4:
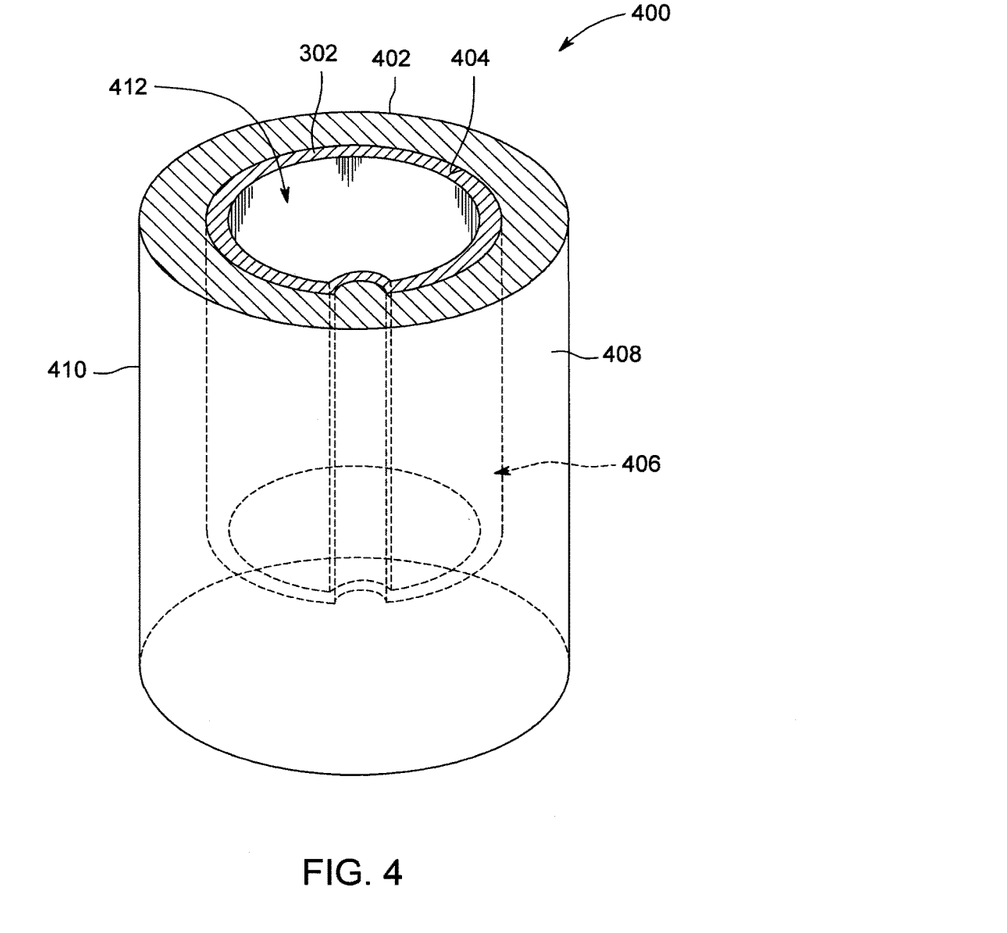
FIG. 4 is a schematic perspective view of an exemplary mold assembly that includes the exemplary jacket shown in FIG. 2 and that may be used to form the exemplary component shown in FIG. 1.

In the exemplary embodiment, jacket material 304 is substantially nickel and component 80 is formed from a nickel-based superalloy, such that jacket material 304 is compatible with the component 80 material when the material in its molten state is introduced into a mold 402 (shown in FIG. 4). In alternative embodiments, the component 80 material is any suitable alloy, and jacket material 304 is at least one material that is compatible with the molten alloy. For example, in some embodiments, the component 80 material is a cobalt-based superalloy, and jacket material 304 is substantially cobalt. For another example, the component 80 material is an iron-based alloy, and jacket material 304 is substantially iron. For another example, the component 80 material is a titanium-based alloy, and jacket material 304 is substantially titanium.

In certain embodiments, thickness 306 is sufficiently thin such that jacket material 304 is substantially absorbed by the component 80 material when the material in its molten or fluid state is introduced into mold 402. For example, in some such embodiments, jacket material 304 is substantially absorbed by the component 80 material such that no discrete boundary delineates jacket material 304 from the component 80 material after the material is cooled. Moreover, in some such embodiments, jacket 302 is substantially absorbed such that, after the component 80 material is cooled, jacket material 304 is substantially uniformly distributed within the component 80 material. For example, a concentration of jacket material 304 proximate outer surface 204 (shown in FIG. 2) is not detectably higher than a concentration of jacket material 304 at other locations within component 80. For example and without limitation, jacket material 304 is nickel and the component 80 material is a nickel-based superalloy, and no detectable higher nickel concentration remains after the component 80 material is cooled, resulting in a distribution of nickel that is substantially uniform throughout the nickel-based superalloy of formed component 80.

In alternative embodiments, thickness 306 is selected such that jacket material 304 is other than substantially absorbed by the component 80 material. For example, in some embodiments, jacket material 304 is partially absorbed by the component 80 material, such that after the component 80 material is cooled, jacket material 304 is other than substantially uniformly distributed within the component 80 material. For example, a concentration of jacket material 304 proximate an outer surface of component 80 (not shown) is detectably higher than a concentration of jacket material 304 at other locations within component 80. In some such embodiments, jacket material 304 is insubstantially absorbed, that is, at most only slightly absorbed, by the component 80 material such that a discrete boundary delineates jacket material 304 from the component 80 material after the component 80 material is cooled. Additionally or alternatively, in some such embodiments, jacket material 304 is insubstantially absorbed, that is, at most only slightly absorbed, by the component 80 material such that at least a portion of jacket 302 remains intact after the component 80 material is cooled.

In some embodiments, jacket 302 is formed on at least a portion of the surface of precursor component 200 by a plating process, such that jacket material 304 is deposited on precursor component 200 until a selected thickness 306 of jacket 302 is achieved. For example, jacket material 304 is a metal, and is deposited on precursor component 200 in a suitable metal plating process. In some such embodiments, jacket material 304 is deposited on precursor component 200 in an electroless plating process. Additionally or alternatively, jacket material 304 is deposited on precursor component 200 in an electroplating process. In alternative embodiments, jacket material 304 is any suitable material, and jacket 302 is formed on precursor component 200 by any suitable plating process that enables jacket 302 to function as described herein.

In some embodiments, jacket material 304 includes a plurality of materials disposed on precursor component 200 in successive layers. For example, precursor material 202 is a thermoplastic, an initial layer of jacket material 304 is a first metal alloy selected to facilitate electroless plating deposition onto precursor material 202, and a subsequent layer of jacket material 304 is a second metal alloy selected to facilitate electroplating to the prior layer of jacket material 304. In some such embodiments, the first and second metal alloys are alloys of nickel. In other embodiments, precursor material 202 is any suitable material, jacket material 304 is any suitable plurality of materials, and jacket 302 is formed on precursor component 200 by any suitable process that enables jacket 302 to function as described herein.

Figure 5:
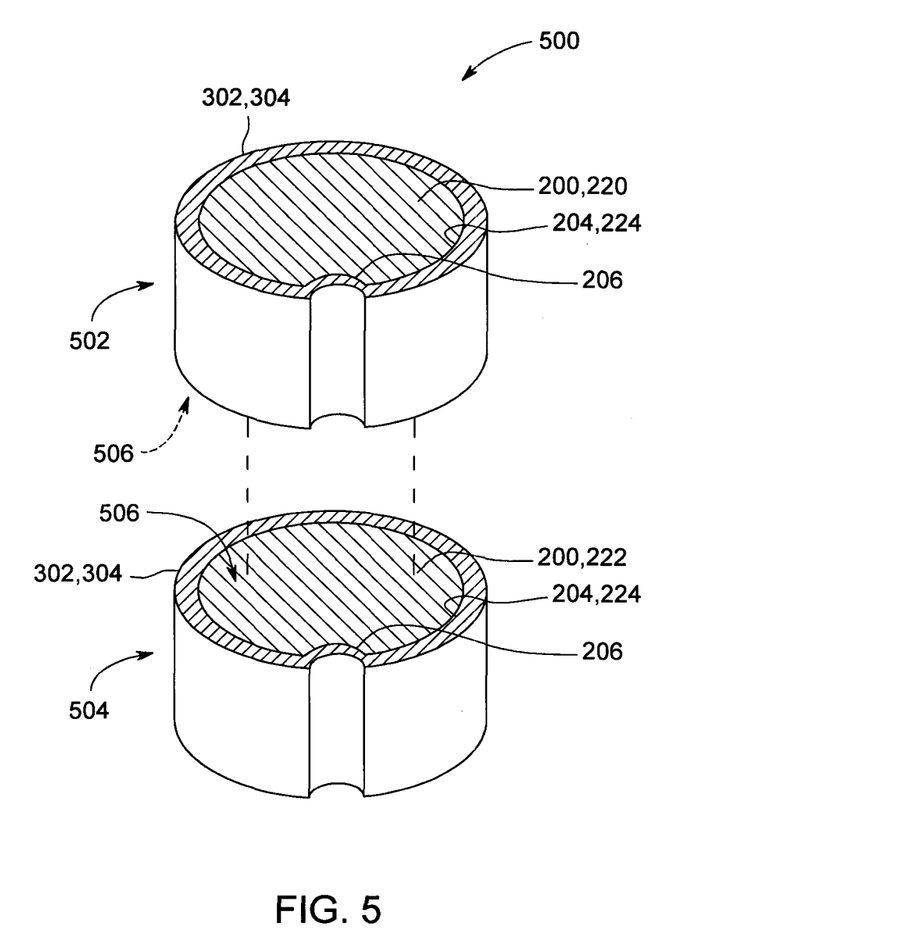
FIG. 5 is a schematic perspective exploded view of a portion of another exemplary jacketed precursor component that may be used to form the component shown in FIG. 1.

In other embodiments, jacketed precursor component 300 is formed from a unitary precursor component 200, in alternative embodiments, jacketed precursor component 300 is formed from a precursor component 200 that is other than unitarily formed, For example, FIG. 5 is a schematic perspective exploded view of a portion of another exemplary jacketed precursor component 500 that may be used to form component 80, such as a component of rotary machine 10 shown in FIG. 1. In the exemplary embodiment, jacketed precursor component 500 includes jacketed precursor component 300 formed from a plurality of separately formed jacketed precursor component sections, for example, jacketed precursor component sections 502 and 504, coupled together. In addition, jacketed precursor component 500 includes precursor component 200 formed from a plurality of separately formed precursor component sections 220 and 222 coupled together.

More specifically, in the illustrated embodiment, each jacketed precursor component section 502 and 504 includes an outer surface 224 of each precursor component section 220 and 222. Precursor component sections 220 and 222 are configured to couple together at a plurality of mating surfaces 506 to form precursor component 200 and outer surface 204. Jacket material 304 is applied to each outer surface 224 of precursor component section 220 and 222 to form jacket 302. In some embodiments, jacket material 304 is not applied to mating surfaces 506. For example, in some embodiments, jacket material 304 is applied to each precursor component section 220 and 222 in a plating process as described herein, and a masking material is first applied to each mating surface 506 to facilitate inhibiting deposition of jacket material 304 on mating surfaces 506. In alternative embodiments, application of jacket material 304 to mating surfaces 506 is inhibited using any suitable method. Moreover, in some embodiments, application of jacket material 304 is similarly inhibited on other selected surfaces of precursor component 200 in addition to, or alternatively from, mating surfaces 506.

In the exemplary embodiment, formation of precursor component 200 and jacketed precursor component 300 from a plurality of separately formed and jacketed precursor component sections 502 and 504 facilitates precise and/or repeatable application of jacket 302 to selected areas of precursor component 200 that have a relatively increased structural complexity. Furthermore, in some such embodiments, masking of mating surfaces 506 during application of jacket material 304 facilitates coupling together jacketed precursor component sections 502 and 504. In alternative embodiments, jacket 302 is formed on the assembled precursor component 200 subsequent to coupling together of precursor component sections 220 and 222.

In some embodiments, jacket 302 structurally reinforces precursor component 200, thus facilitating reducing potential problems that would be associated with production, handling, and use of an unreinforced precursor component 200 to form component 80. For example and without limitation, in some embodiments, precursor component 200 is a relatively brittle material subject to a relatively high risk of fracture, cracking, and/or other damage. In other embodiments, precursor component 200 is a relatively soft material subject to an increased risk of deformation, distortion, and/or other damage. Thus, in some such embodiments, forming and transporting jacketed precursor component 300 presents a much lower risk of damage to precursor component 200, as compared to using an unjacketed precursor component 200. Similarly, in some such embodiments, forming mold 402 (shown in FIG. 4) around jacketed precursor component 300, such as by repeated investment of jacketed precursor component 300 in a slurry of mold material, presents a much lower risk of damage to jacketed precursor component 300, as compared to using an unjacketed precursor component 200. Thus, in certain embodiments, use of jacketed precursor component 300 presents a much lower risk of failure to produce an acceptable component 80, as compared to forming component 80 using an unjacketed precursor component 200.

Returning to FIG. 3, in alternative embodiments, jacket 302 is formed in any suitable fashion. For example, in one such alternative embodiment, jacket 302 is formed using a process that does not involve precursor component 200. In some such embodiments, jacket 302 is separately formed in one or more sections (not shown), and the sections are then coupled around precursor component 200 to form jacketed precursor component 300.

For example, in one such embodiment, jacket 302 is formed at least partially using a suitable additive manufacturing process, and jacket material 304 is selected to facilitate additive manufacture of jacket 302. For example, a computer design model (not shown) of jacket 302 is developed from a computer design model of component 80, with preselected thickness 306 of jacket 302 added in the computer design model adjacent selected surfaces of component 80, and then component 80 itself is removed from the computer design model. The computer design model for jacket 302 is sliced into a series of thin, parallel slices (not shown), and a computer numerically controlled (CNC) machine deposits successive layers of jacket material 304 from a first end 308 to a second end 310 of jacket 302 in accordance with the model slices to form jacket 302. In some embodiments, the successive layers of jacket material 304 are deposited using at least one of a direct metal laser melting (DMLM) process, a direct metal laser sintering (DMLS) process, and a selective laser sintering (SLS) process. Additionally or alternatively, jacket 302 is formed using any other suitable additive manufacturing process. It should be understood that in certain embodiments, jacket 302 is formed from a plurality of separately additively manufactured sections that are subsequently coupled together, such as around precursor component 200, in any suitable fashion.

In certain embodiments, the formation of jacket 302 by an additive manufacturing process enables jacket 302 to be formed with a nonlinearity, structural intricacy, precision, and/or repeatability that is not achievable by other methods. Accordingly, the formation of jacket 302 by an additive manufacturing process enables the complementary formation of component 80 with a correspondingly increased nonlinearity, structural intricacy, precision, and/or repeatability. Moreover, in some embodiments, the formation of jacket 302 by an additive manufacturing process decreases a cost and/or a time required for manufacture of component 80, as compared to forming component 80 directly by additive manufacture using the component 80 material.

FIG. 4 is a schematic perspective view of an exemplary mold assembly 400 that includes jacket 302 and may be used to form component 80, such as a component of rotary machine 10 shown in FIG. 1. In the exemplary embodiment, mold assembly 400 includes jacket 302 positioned with respect to mold 402. An interior wall 404 of mold 402 defines a mold cavity 406 within mold 402, and jacket 302 is received in mold cavity 406. More specifically, interior wall 404 defines a shape corresponding to the exterior shape of component 80, such that jacket 302, and more particularly, outer surface 312 (shown in FIG. 3) of jacket 302 that has a shape corresponding to the exterior shape of component 80, is coupled against interior wall 404.

In the exemplary embodiment, mold 402 is formed from a mold material 408. For example, in the exemplary embodiment, mold material 408 is a refractory ceramic material selected to withstand a high temperature environment associated with the molten state of the material used to form component 80. In alternative embodiments, mold material 408 is any suitable material that enables component 80 to be formed as described herein. Moreover, in the exemplary embodiment, mold 402 is formed by a suitable investment process. For example and without limitation, jacketed precursor component 300 (shown in FIG. 3) is repeatedly dipped into a slurry of mold material 408, which is allowed to harden to create a shell 410 of mold material 408, and shell 410 is fired to form mold 402. In alternative embodiments, mold 402 is formed by any suitable method that enables mold 402 to function as described herein.

In the exemplary embodiment, precursor component 200 (shown in FIG. 2) is removed from jacket 302, for example by oxidizing or "burning out" precursor material 202 (shown in FIG. 2) from jacketed precursor component 300 after mold 402 is formed around jacketed precursor component 300. In alternative embodiments, jacket 302 is first at least partially decoupled from precursor component 200 before mold 402 is formed around jacket 302, for example by oxidizing or "burning out" precursor material 202 from jacket 302. Jacket 302 defines at least one jacketed cavity 412 after removal of precursor component 200. More specifically, jacketed cavity 412 is defined in a space at least partially created by removal of precursor component 200 from jacketed precursor component 300. In alternative embodiments, jacket 302 is formed without using precursor component 200, as described herein, and defines the at least one jacketed cavity 412 upon being formed without precursor component 200. Jacketed cavity 412 is configured to receive molten or fluid material therein to form at least a portion of component 80. More specifically, the molten or fluid material used to form component 80 is added to jacketed cavity 412 and cooled, such that the component 80 material and jacket material 304 bounded by interior wall 404 at least partially define at least a portion of component 80, as described herein. In some embodiments, jacket material 304 of jacket 302 is substantially absorbed by the molten material used to form component 80, while in other embodiments, for example, jacket 302 remains at least partially intact adjacent the component 80 material within jacketed cavity 412, as described herein. Moreover, in some alternative embodiments, jacket 302 defines the at least one jacketed cavity 412 having a shape corresponding to any suitable portion of component 80 for use in any suitable application.

In the exemplary embodiment, precursor material 202 is selected to facilitate removal of precursor component 200 from within jacketed precursor component 300 to form jacket 302. For example, precursor material 202 is selected to have an oxidation or auto-ignition temperature that is less than a melting point of jacket material 304. A temperature of mold 402, and thus jacketed precursor component 300, is increased to or above the oxidation or auto-ignition temperature of precursor material 202, such that precursor component 200 is oxidized or burned out of jacket 302. Moreover, in some such embodiments, precursor component 200 is oxidized at least partially simultaneously with the firing of shell 410 during the formation of mold 402.

In an alternative embodiment, precursor material 202 is oxidized and/or otherwise removed prior to firing shell 410. Additionally or alternatively, precursor material 202 is melted and drained from within jacketed precursor component 300. In other alternative embodiments, precursor material 202 is selected to be a softer material than jacket material 304, and precursor component 200 is machined out of jacketed precursor component 300. For example, a mechanical grinding device is routed into jacket 302 to break up and/or dislodge precursor material 202 to facilitate removal of precursor component 200. Additionally or alternatively, precursor material 202 is selected to be compatible with a chemical removal process, and precursor component 200 is removed from jacket 302 using a suitable solvent. In other alternative embodiments, precursor material 202 is any suitable material that enables precursor component 200 to be removed from within jacketed precursor component 300 in any suitable fashion. Moreover, as described herein, in some alternative embodiments, jacket 302 is formed by a process that does not include any use of precursor component 200, such that no precursor material 202 needs to be removed to form the at least one jacketed cavity 412.

Referring to FIG. 1, it should be recalled that, although component 80 in the exemplary embodiment is, for example, combustion liner 26, the swirler (not shown) of combustor 24, rotor blade 70, or alternatively stator vane 72, in alternative embodiments, component 80 is any component suitably formable as described herein and for use in any application.

Figure 6:
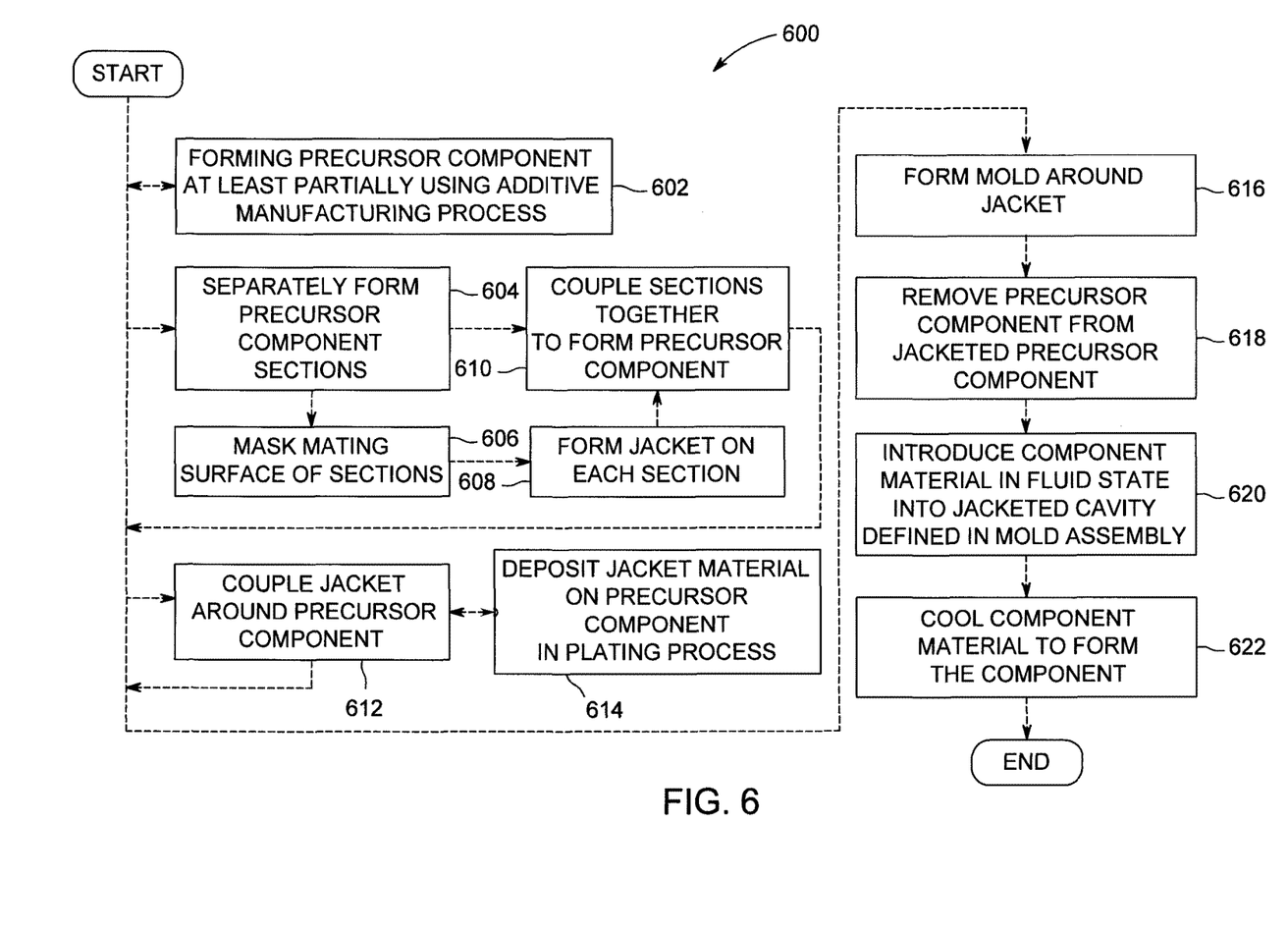
FIG. 6 is a flow diagram of an exemplary method of forming a component, such as the exemplary component shown in FIG. 1.

An exemplary method 600 of forming a component, such as component 80, is illustrated in a flow diagram in FIG. 6.

With reference also to FIGS. 1-5, exemplary method 600 includes forming 602 precursor component 200 at least partially using an additive manufacturing process. Additionally or alternatively, method 600 further includes separately forming 604 a plurality of precursor component sections 220 and 222, and coupling 610 precursor component sections 220 and 222 together to form precursor component 200.

In the exemplary embodiment, method 600 also includes coupling 612 jacket 302 around precursor component 200, shaped to correspond to a net shape of component 80, or at least portions thereof, to form a jacketed precursor component 300. For example, but not by way of limitation, the step of coupling 612 jacket 302 includes coupling jacket material 304 that includes at least one of nickel, cobalt, iron, and titanium. Additionally or alternatively, the step of coupling 612 jacket 302 further includes depositing 614 jacket material 304 on precursor component 200 in a plating process, as described herein.

In some embodiments, the step of coupling 612 jacket 302 includes forming 608 jacket 302 on each of precursor component sections 220 and 222 prior to the step of coupling 610 the sections together, and method 600 also includes masking 606 at least one mating surface 506 of precursor component sections 220 and 222 prior to the step of forming 608 jacket 302, such that deposition of jacket material 304 on the at least one mating surface 506 is inhibited.

In the exemplary embodiment, method 600 includes forming 616 mold 402 around jacket 302, such as by an investment process, as described herein. For example, jacketed precursor component 300 is at least partially covered by mold material 408, which is allowed to harden to create shell 410 of mold material 408. Shell 410 is fired to form mold 402. In some embodiments, method 600 further includes removing 618 precursor component 200 from jacketed precursor component 300.

In addition, method 600 includes introducing 620 a component material, such as the material used to form component 80, in a molten or fluid state into jacketed cavity 412 defined in mold assembly 400. The mold assembly includes jacket 302 positioned with respect to mold 402. In some embodiments, for example, jacketed cavity 412 is defined in a space created by removal of precursor component 200 from jacketed precursor component 300. In other embodiments, for example, jacket 302 is formed without using precursor component 200, and initially includes jacketed cavity 412. Mold 402 includes interior wall 404 that defines mold cavity 406 within the mold 402. Jacket 302, and more particularly, outer surface 312 of jacket 302, is coupled against interior wall 404. In some embodiments, introducing the component material used to form component 80 in a molten or fluid state into jacketed cavity includes at least partially absorbing jacket material 304 of jacket 302 by the component 80 material. In other embodiments, jacket material 304 is substantially absorbed by the component 80 material such that no discrete boundary delineates jacket material 304 from the component 80 material after the material is cooled. Moreover, in some such embodiments, jacket 302 is substantially absorbed such that, after the component 80 material is cooled, jacket material 304 is substantially uniformly distributed within the component 80 material.

Method 600 also includes cooling 622 the component material used to form component 80. Interior wall 404 and jacket 302 cooperate to define an outer surface of component 80 therein.

The above-described embodiments of mold assemblies and methods enable making of hot gas path components, or components for other suitable applications, with improved precision and repeatability as compared to at least some known mold assemblies and methods. Specifically, the mold assembly includes a mold cavity having at least one jacketed cavity defined between jacket walls. The jacket and mold interior wall cooperate to define the outer wall of the component therein. Also specifically, the jacket protects the precursor component from damage during forming and firing of the mold. Also specifically, the jacketed precursor component facilitates reducing a time and cost of preparing the mold assembly for prototyping or production operations. In some cases, the above-described embodiments enable formation of components having structures that cannot be precisely and/or repeatably formed using other known mold assemblies and methods.

An exemplary technical effect of the methods, systems, and apparatus described herein includes at least one of: (a) reducing or eliminating fragility problems associated with forming, handling, transport, and/or storage of a pattern used in forming a component; (b) improving precision and repeatability of formation of components having intricate structures; and (c) enabling increased speed in design iterations by rapidly forming molds and casting components having intricate structures.

Exemplary embodiments of mold assemblies and methods including jacketed mold cavities are described above in detail. The jacketed mold cavities, and methods and systems using such jacketed mold cavities, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use investment casting mold assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a component, said method comprising:
    coupling a jacket around at least a portion of a precursor component to form a jacketed precursor component, the jacket shaped to correspond to a net shape of an outer surface of the component;
    forming a mold around the jacket; and
    introducing a component material in a fluid state into a jacketed cavity defined in the mold, wherein the jacketed cavity is defined in a space at least partially created by removal of the precursor component from the jacketed precursor component, further comprising cooling the component material to form the component, wherein a shape of an outer surface of the jacket at least partially defines the net shape of the outer surface of the component.

2. The method in accordance with claim 1, wherein introducing the component material in a fluid state into the jacketed cavity comprises at least partially absorbing the jacket by the component material.

3. The method in accordance with claim 1, wherein introducing the component material in a fluid state into the jacketed cavity comprises substantially absorbing the jacket by the component material such that no discrete boundary delineates a jacket material from the component material after the material is cooled.

4. The method in accordance with claim 1, further comprising forming the precursor component at least partially using an additive manufacturing process.

5. The method in accordance with claim 1, further comprising:
    separately forming a plurality of precursor component sections; and
    coupling the plurality of precursor component sections together to form the precursor component.

6. The method in accordance with claim 5, wherein coupling the jacket comprises forming the jacket on each of the precursor component sections prior to coupling the plurality of precursor component sections together, said method further comprising masking at least one mating surface of the plurality of precursor component sections prior to forming the jacket, such that forming the jacket on the at least one mating surface is inhibited.

7. The method in accordance with claim 1, wherein coupling the jacket comprises depositing a jacket material on the precursor component using a plating process.

8. The method in accordance with claim 1, wherein forming the mold around the jacket comprises:
    at least partially covering the jacketed precursor component with a mold material to form a shell: and
    firing the shell to form the mold.

9. The method in accordance with claim 8, further comprising removing the precursor component from the jacketed precursor component at least partially by increasing a temperature of the mold at least to at least one of an oxidation temperature and an auto-ignition temperature of the precursor component, such that the precursor component is at least one of oxidized and burned out of the jacket.

10. The method in accordance with claim 8, further comprising removing the precursor component from the jacketed precursor component at least partially simultaneously with the firing of the shell during the forming of the mold.

11. A method of forming a component, said method comprising:
    forming a jacket from a jacket material, the jacket having an outer surface shaped to correspond to a net shape of an outer surface of the component;
    coupling a refractory mold material to an outer surface of the jacket to form a shell;
    firing the shell to form a mold assembly, the jacket defining a jacketed cavity within the mold assembly;
    introducing a component material in a fluid state into the jacketed cavity defined in the mold assembly; and
    cooling the component material to form the component, wherein a shape of the outer surface of the jacket at least partially defines the net shape of the outer surface of the component.

12. The method in accordance with claim 11, wherein forming the jacket comprises forming the jacket at least partially using an additive manufacturing process.

13. The method in accordance with claim 11, wherein coupling the refractory mold material to the outer surface of the jacket comprises coupling a refractory ceramic material configured to withstand a high temperature environment associated with a molten state of the component material.

14. The method in accordance with claim 11 further comprising:
    separately forming a plurality of precursor component sections; and
    coupling the plurality of precursor component sections together to form precursor component.

15. The method in accordance with claim 14, wherein forming the jacket from the jacket material comprises depositing the jacket material on the precursor component using a plating process.

16. The method in accordance with claim 15 further comprising removing the precursor component from the jacket such that the jacketed cavity is defined.

17. The method in accordance with claim 14 further comprising masking at least one mating surface of the plurality of precursor component sections prior to forming the jacket, such that forming the jacket on the at least one mating surface is inhibited.

18. The method in accordance with claim 14, wherein forming the jacket from the jacket material comprises forming the jacket on each of the precursor component sections prior to coupling the plurality of precursor component sections together.

19. The method in accordance with claim 14, wherein separately forming the plurality of precursor component sections comprises separately forming the plurality of precursor component sections at least partially using an additive manufacturing process.

20. The method in accordance with claim 12, wherein forming the jacket from the jacket material comprises forming the jacket from at least one of nickel, cobalt, iron, and titanium.

21. A method of forming a component of a rotary machine from an alloy, the method comprising:
    coupling a jacket around at least a portion of a precursor component to form a jacketed precursor component, the precursor component having a reduced size relative to a net size of the component, the jacket having an outer surface shaped to correspond to a net shape of an outer surface of the component such that a combined size of the jacket and the precursor component corresponds approximately to the net size of the component;
    forming a mold around the jacket; and
    introducing a component material in a fluid state into a jacketed cavity defined in the mold, wherein the jacketed cavity is defined in a space at least partially created by removal of the precursor component from the jacketed precursor component.

* * * * *